Aug. 28, 1956 C. L. KUNICK 2,760,441
BAG TRUCK TOW BAR

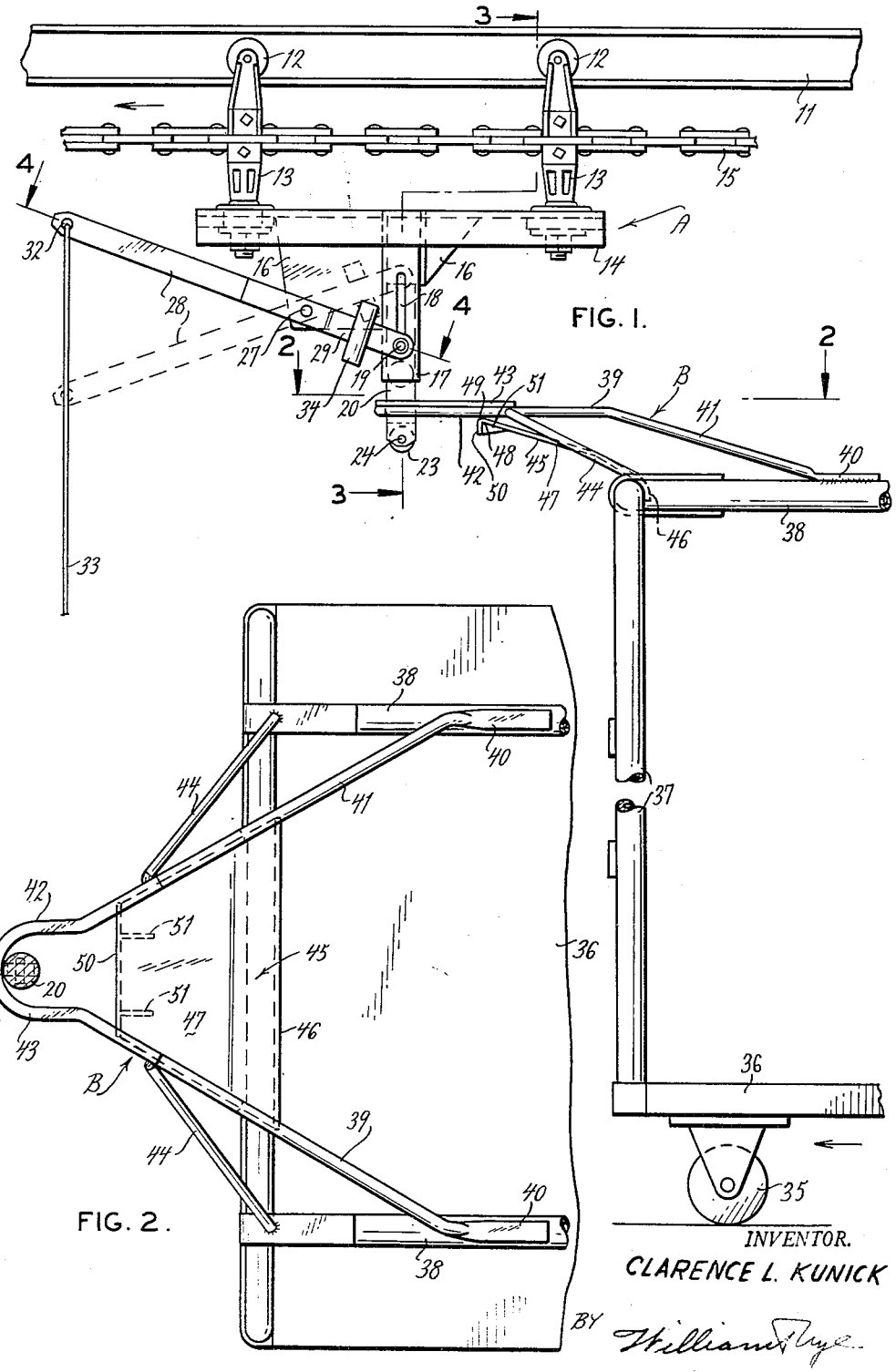

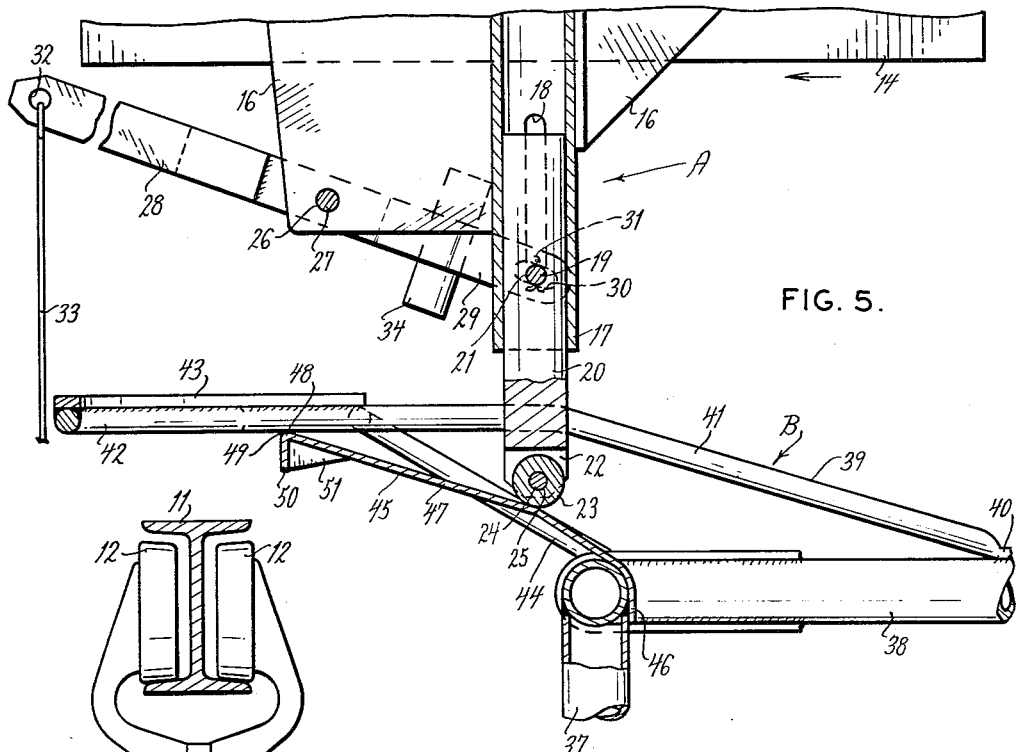
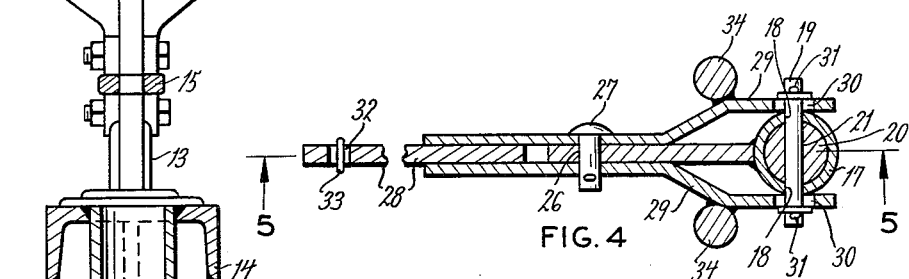
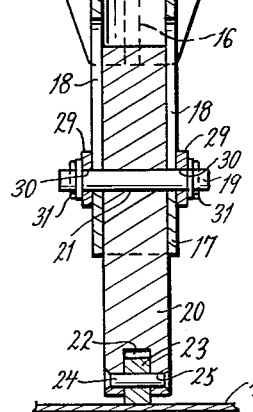

Filed June 29, 1953 3 Sheets-Sheet 3

INVENTOR
CLARENCE L. KUNICK
BY William Nye
ATTORNEY

United States Patent Office 2,760,441
Patented Aug. 28, 1956

2,760,441

BAG TRUCK TOW BAR

Clarence L. Kunick, Bogalusa, La., assignor, by mesne assignments, to Crown Zellerbach Corporation, San Francisco, Calif., a corporation of Nevada Application June 29, 1953, Serial No. 364,547

8 Claims. (Cl. 104—170)

This invention appertains, in general, to a conveyor system and more particularly to a power driven overhead conveyor having releasable means for automatic engagement with floor trucks.

Various overhead power systems for moving and actuating industrial trucks and the like have been provided. In many installations it is necessary that the systems be suitable for moving loaded trucks up and down steep ramps between various floor levels. Also, since, in the majority of installations, a plurality of loaded trucks are constantly being moved by the conveyor system at any given time, it is important that provision be made to engage and disengage the trucks without the necessity of starting and stopping or otherwise intermittently operating the conveyor. A continuous operation not only greatly reduces the wear and tear on the conveyor system and the floor trucks, but substantially reduces the amount of power required to operate the system, since only one or two trucks are coupled into the moving system at any given time.

In a system that is in continuous motion, it is imperative that means be provided for safely engaging and disengaging trucks into and from the conveyor system by manual operation. Such engaging means should be operable by personnel from a safe distance from the moving vehicles. It is therefore an object of this invention to provide safe means for releasably engaging a floor truck to a moving conveyor system without halting the conveyor mechanism.

Another object of this invention is to provide an attachment for a constantly moving, overhead conveyor system which will automatically engage a coupling device on a floor truck which has been properly positioned underneath the conveyor system.

A further object of this invention is to provide means for engaging a constantly moving, overhead conveyor means to movable floor trucks, wherein the conveying system will be capable of not only imparting horizontal movement to the trucks, but movement up and down inclined ramps as well.

Still another object is to provide a means for disengaging a moving conveyor to wheeled vehicles, the means being operable by a simple chain pull or similar device which may be actuated by personnel standing a safe distance from the moving vehicles.

Still another object is to provide a truck engaging means on an overhead conveyor, which is adapted to automatically engage a rigid coupling device on a floor truck.

Another object of this invention is to provide a conveyor engaging means for floor trucks which may be installed on existing equipment without expensive modification or alteration.

In the accompanying drawings which form a part of this specification, like numerals and symbols refer to like parts wherever they occur.

Fig. 1 is a side elevation of a typical installation employing a preferred embodiment of this invention. In this view, the driving means connected to the overhead conveyor is shown in contact with the engaging member of a standard floor truck.

Fig. 2 is a top view shown through section 2—2, of Fig. 1, of a floor truck having an engaging member employing a preferred embodiment of this invention.

Fig. 3 is a vertical, sectional view of the conveyor and the attached driving means shown through 3—3 of Fig. 1.

Fig. 4 is a sectional view of a portion of the driving means shown through 4—4 of Fig. 1.

Fig. 5 is an enlarged sectional view of the driving means shown in contact with the engaging member of a floor truck.

Figure 6:
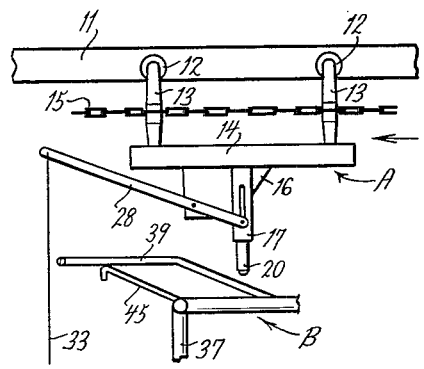
Figs. 6, 7 and 8 illustrate the successive steps of engagement of the conveyor with the floor truck.

A side elevation of a preferred form of a complete apparatus and floor truck embodying this invention is shown in Fig. 1. A driving means A is connected to an overhead I beam 11 providing a supporting track for rollers 12 which in turn support trolley brackets 13. The trolley brackets 13 are maintained in rigid, spaced relation by a spacing member 14. A power driven chain 15 engages the trolley brackets 13 to impart motion to the device. In the embodiment illustrated in Fig. 1, the motion of the device is in the direction indicated by the arrow shown adjacent to and beneath member 11. Substantially vertical supporting brackets 16 are welded or otherwise secured to the underface of the spacing member 14. The supporting brackets 16 are rigidly secured to a vertically mounted sleeve 17. In the embodiment illustrated, the sleeve 17 is secured to the supporting brackets 16 by means of welded joints, however, any other suitable connecting means may be employed. The sleeve 17 is provided with a pair of opposed lateral slots 18 of suitable width to permit vertical sliding movement of a connecting pin 19 which extends therethrough. A shaft 20 is slidably positioned within the sleeve member 17. The diameter of the shaft 20 is preferably slightly less than the inside diameter of the sleeve 17, and is provided with a cylindrical opening 21 extending therethrough in right angular relation to its axis. The opening 21 is of suitable dimension to snugly receive the connecting pin 19. The lower end of the shaft 20 is notched as at 22 to provide space for a rotatable wheel 23 which is connected to the shaft 20 by means of a small pin 24 which is inserted into an opening 25. The lower margin of one of the supporting brackets 16 is provided with a pivot opening 26 through which is inserted a pivot pin 27. Pivotably mounted on the pin 27 is a lever member 28 which, in the preferred embodiment illustrated, is provided with rigidly connected, Y-shaped leg portions 29 which are dimensioned to terminate adjacent the vertical slots 18 as illustrated in the views shown in Figs. 3 and 4. The end margins of the leg portions 29 are provided with elongated openings 30 which are in alignment with the adjacent slots 18 and the connecting pin 19. The pin 19 is positioned to extend through the elongated openings 30 and is retained in this position by means of washers and standard cotter pins 31 which extend through openings in each end. The opposite end of the lever member 28 is provided with an opening 32 to accommodate a pull chain or rope 33. A pair of counterweights 34 may be connected to the leg portions 29 to provide added weight. The counterweights 34, in the preferred embodiment, are of sufficient weight to maintain the lever arm 28 and the attached leg portions 29 in the position shown by the solid lines in Figs. 1 and 5. In this position the shaft 20 remains in a fully extended position with respect to the sleeve 17. The lower portion of the sleeve 17, defined by the lower extremity of the slot 18, engages the connecting pin 19 to maintain the shaft 20 within the sleeve 17.

The mechanism for driving the chain 15 is not shown. Any suitable driving arrangement may be used; for instance, a pulley, designed to engage the chain 15, may be provided, and any desired means, such as an electric motor, may be attached to the pulley to provide the necessary motive power.

An embodiment of a suitable engaging member B, adapted to be attached to a floor truck or mast truck, is illustrated in Figs. 1, 2 and 5. The preferred form of the bracket employing this invention may be attached to any suitable type floor truck. One example of a truck is shown in Fig. 1 and is provided with a pivotably mounted front wheels 35, a base member 36 and an upright, vertical forward member 37. In the truck illustrated, a pair of longitudinally positioned, horizontal top bars 38 are shown connected to the upper portion of the forward member 37. A coupling member 39 is connected at its free end extremities 40 to the top bar members 38. The coupling member is preferably formed with an upwardly inclined portion 41 and a horizontally disposed, U-shaped, shaft-engaging portion 42. The shaft-engaging portion 42 may, if desired, be reinforced with a U-shaped reinforcing bar 43. Angular support members 44, extending from the horizontal or shaft-engaging portion 42 to the top bar 38 may be added for additional strength and rigidity. A guide plate 45 is secured at its lower end edge to the upper portion of the forward member 37. In the embodiment illustrated, the lower portion of the guide plate 45 is curved smoothly downwardly as at 46. The central portion 47 of the guide plate is inclined gradually upward and the top portion 48 is secured, as at 49, to the shaft-engaging portion 42. The guide plate 45 is bent sharply, vertically, downwardly to form a flat portion 50, which, in the embodiment illustrated, is firmly maintained in positioned by triangular shaped reinforcing members 51 which are firmly secured to the underface thereof.

Figure 7:
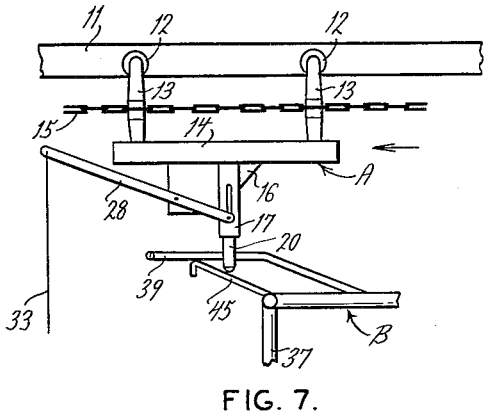
Figure 8:
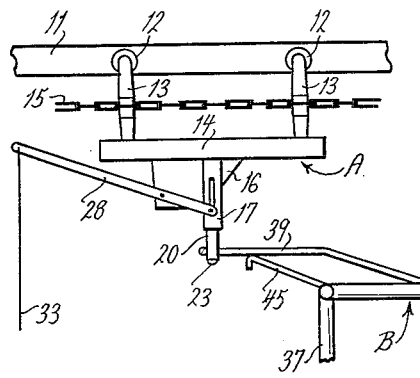
Figure 9:
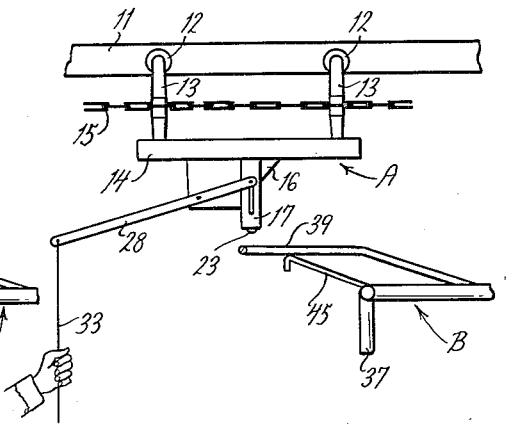
Figs. 9 and 10 illustrate the successive steps of release of the conveyor and the floor truck.
Figure 10:
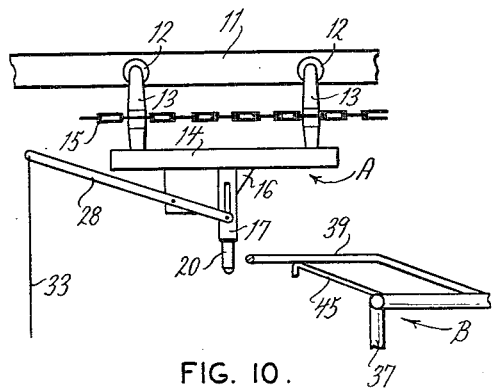

A floor truck having a suitable engaging member B may be coupled to the overhead conveyor by orienting the floor truck so that it is in position relative to the driving means A as shown in Fig. 6. As the constantly moving driving means A nears the engaging member B, the wheel 23 first contacts the inclined central portion 47 as shown in either Fig. 5 or 7. As the driving member A continues its motion, the wheel 23 rides up the central portion 27 thereby forcing the shaft 20 upwardly into the sleeve 17. As shaft 20 rises, the end of the lever member 28 will move downwardly and the connecting pin 19 will slide upwardly within the slots 18. The elongated opening 30 permits the leg portions 29 to move upwardly with the shaft 20, without binding the connecting pin 19. After the wheel 23 has passed beyond the top portion 28 of the engaging member B, the weight of the shaft 20 and the counterweight 34 will cause the shaft 20 to fall downwardly in the sleeve 17 until the wall of the sleeve adjacent the lower extremity of the slot 18 engages the connecting pin 19, thereby terminating the downward movement. As the driving means A continues to move onward, the leading edge of the shaft 20 will contact the shaft-engaging portion 42 of the engaging member B at substantially the point indicated at 52. The continuing forward motion of the driving means will then cause the floor truck to roll forward as shown at Figs. 1 and 8. When it is desired to disengage the floor truck from the conveyor, the pull chain 33 and the attached lever 28 are pulled sharply downwardly. The downward movement of the lever 28 pivoted at 27 acts to force the leg portion 29 and the attached pin member 19 and shaft 20 upwardly into sleeve 17, as shown in Fig. 9. In this position the wheel 23 is above the level of the shaft-engaging portion 42 of the engaging member B. As soon as the forward motion of the chain-driven driving means A has caused the shaft 20 to proceed in front of the shaft engaging portion 42, the pull chain 33 may be released and the shaft 23 will automatically descend as shown in Fig. 10, leaving the floor truck free to be manually moved out of the conveyor line.

It is apparent, from the above description, that it is not necessary to stop the chain driven driving means A in order to engage or disengage a floor truck. It is also apparent that due to the relatively simple operation of the device it is possible to operate the engaging member by operating the pull chain from a relatively safe distance beside the floor truck. Furthermore, the floor truck will be automatically engaged by the driving means without the requirement of any manual assistance.

While a preferred embodiment of this invention has been illustrated and described, it will be understood that various modifications may be employed without departing from the scope of the invention as defined in the appended claims.

What I claim is:

1. A materials handling system having a constantly moving overhead conveyor and a floor truck adapted to be supported on a surface, the improved coupling apparatus comprising a driving member connected to the overhead conveyor, the driving member having a vertically movable, upright shaft mounted thereon, and an engaging member having a U-shaped, horizontally disposed, shaft-engaging bracket rigidly mounted to the top of the floor truck, and an inclined guide plate secured within the shaft-engaging bracket, the guide plate being adapted to slidably engage the lower end of the upright shaft to force it upward and over the upper edge of said guide plate when the shaft is moved horizontally into contact with the base of the shaft-engaging bracket, when the upright shaft is disengaged from the inclined guide plate, the lower end thereof being adapted to be positioned substantially below the level of the shaft-engaging bracket and the upper edge of the inclined guide plate.

2. A materials handling system having a constantly moving overhead conveyor and a floor truck adapted to be supported on a trackless surface, the improved automatic coupling apparatus comprising a driving member connected to the overhead conveyor, the driving member having a vertical, movable, upright shaft mounted thereon and an engaging member having a U-shaped, horizontally disposed, shaft-engaging bracket rigidly mounted to the top of the floor truck, and an inclined guide plate secured within the shaft-engaging bracket, the upper edge of the guide plate being spaced from the base of the shaft-engaging bracket a distance at least equal to the thickness of the upright shaft, the guide plate being adapted to slidably engage the lower end of the upright shaft to force it upward when the driving member is moved horizontally through the open end of the shaft-engaging bracket to the closed base portion thereof, after the upright shaft has passed the upper edge of the inclined guide plate, the shaft being adapted to move automatically downwardly below the upper edge of the inclined guide plate and into the space between the guide plate and the base end of the shaft-engaging bracket and into contacting engagement with said bracket.

3. A materials handling system having a constantly moving overhead conveyor and a floor truck adapted to be supported on a trackless surface, the overhead conveyor having a track adapted to support a pair of similar, downwardly suspended trolleys rigidly connected together by a spacing member secured therebetween, a power driven motion imparting chain connected to the trolley members, the floor truck having a base portion supported by wheels, and a rigidly connected, vertical member extending above the base, the improved coupling apparatus comprising a driving member connected to the spacing member mounted between the trolley members and having a vertically disposed, tubular sleeve member provided with an opposed pair of vertical slots through the side walls thereof, the slots terminating short of the end edges of the sleeve member, a shaft member slidably disposed within the vertical sleeve and provided with a transverse connecting pin extending therethrough, the connecting pin projecting outwardly through the opposed vertical slots in the sleeve, a vertically disposed bracing plate for connecting and maintaining the sleeve member in rigid relation to the spacing member, a vertically, movable lever member pivotally mounted on the vertical plate and having end extensions with elongated openings therethrough to receive the ends of the connecting pin, the bottom shaft having a rotatably mounted wheel thereon, in the normal position of the driving member, the free end of the lever member being positioned angularly upwardly and substantial portions of the shaft member extending downwardly below the vertical sleeve, the end portions of the connecting pin being in contacting engagement with the end margins of the vertical sleeve adjacent the bottom of the opposed vertical slots therethrough, an engaging member having a horizontally disposed, U-shaped, shaft-engaging bracket fixed to and spaced above the upper portion of the rigid vertical member extending from the base of the floor truck, an upwardly inclined guide plate rigidly secured within the U-shaped bracket, the upper edge thereof terminating in spaced relation to the inner, curved, base portion of the U-shaped bracket a distance greater than the diameter of the shaft of the driving member, the lower edge of the upwardly inclined guide plate terminating below the wheel on the lower edge of the shaft member, the inclined guide plate being adapted to force the shaft upwardly and beyond the upper edge of said guide plate when the driving member is moved horizontally through the open legs of the U-shaped, shaft-engaging bracket into contact with the closed base thereof, the shaft being adapted to move automatically downwardly so that the lower edge thereof is below the upper edge of the guide plate.

4. The combination set forth and claimed in claim 3 wherein the upper edge of the inclined guide plate is substantially within the plane containing the horizontally disposed, U-shaped, shaft-engaging bracket.

5. The combination set forth and claimed in claim 4 wherein the upper edge of the inclined guide plate is provided with a vertically, downwardly disposed reinforcing panel, and the inner surface of the closed base portion of the U-shaped, shaft-engaging member is provided with a curved, reinforcing plate rigidly secured thereto.

6. A materials handling system having a constantly moving overhead conveyor and a floor truck adapted to be supported on a trackless surface, the improved coupling apparatus comprising a driving member and an engaging member, the driving member being secured to the constantly moving overhead conveyor and provided with a vertically disposed, hollow sleeve with a vertical shaft slidably disposed within, the shaft being provided with a transverse connecting pin extending through a diameter thereof and extending through and terminating outside of a slot in the side wall of the vertical sleeve, a vertically movable lever arm pivotably mounted to the driving member, the lever arm having a free end and an inner end having an elongated opening therethrough to receive the connecting pin, and a rigid vertical member extending upwardly from the floor truck and having the engaging member secured to its upper extremity, the engaging member having a U-shaped, shaft-engaging bracket disposed in a horizontal plane spaced above the upper edge thereof being spaced from the base portion of the shaft-engaging bracket a distance greater than the thickness of the vertical shaft member, the lower edge of the inclined guide plate being spaced below the level of the bottom end of the vertical shaft and adapted, when said shaft and said driving member are moved horizontally through the open legs of the engaging member toward the closed base thereof, to slidably contact the lower end of the shaft thereby forcing it upwardly, after the driving member and the vertical shaft have passed the upper edge of the inclined plane the vertical shaft being adapted to automatically move downwardly below the upper edge of the inclined plate and the closed base portion of the U-shaped, shaft-engaging member into the space therebetween.

7. The combination set forth and claimed in claim 6 wherein when the free end of the lever member is moved downwardly, the inner end of the lever member, which is connected to the connecting pin extending through the vertical shaft, moves the shaft upwardly into the vertical sleeve to a position above the level of the horizontally disposed U-shaped, shaft-engaging member.

8. A materials handling system having a constantly moving overhead conveyor and a floor truck adapted to be supported on a trackless surface, a track for supporting a pair of similar, downwardly disposed trolleys rigidly connected together by a spacing member secured therebetween, a power driven, motion imparting chain connected to the trolleys, the floor truck having a base and a rigidly connected, vertical member extending from the front thereof, the improved automatic coupling apparatus comprising a driving means connected to said spacing member and an engaging member mounted on said truck, said driving member having a vertically disposed, hollow sleeve with an opposed pair of vertical slots through the side walls thereof, the slots terminating at the end margins of the sleeve member, a shaft member slidably disposed within the vertical sleeve and provided with a transverse connecting pin extending therethrough, the connecting pin projecting outwardly through the opposing vertical slots in the sleeve, a vertically pivotable lever member having spaced end extensions with elongated openings therethrough to receive the ends of the connecting pin, in the normal position of the driving member, the free end of the lever member being positioned angularly upwardly and substantial portions of the shaft member extending downwardly below the vertical sleeve, and the projecting end portions of the connecting pin being in contacting engagement with the end margins of the vertical sleeve adjacent the bottom of the opposed vertical slots therethrough, said engaging member having a horizontally disposed U-shaped, shaft-engaging bracket fixed to and spaced above the upper extremity of the vertical member extending from the base of the floor truck, an upwardly inclined guide plate rigidly secured to the sides of the U-shaped bracket, the upper edge thereof terminating a distance from the inner curved base portion of the engaging bracket substantially greater than the diameter of the vertical shaft of the driving member, the lower edge of the inwardly inclined guide plate terminating below the level of the lower end of the vertical edge of the shaft member when it is disposed in the normal position, the inclined guide plate being adapted to engage the lower end of the vertical shaft to force the shaft upwardly when the driving member is moved horizontally through the open legs of the U-shaped, shaft-engaging bracket toward the closed base thereof, said shaft being adapted to automatically move downwardly so that the lower edge thereof is below the upper edge of the inclined guide plate and the U-shaped, shaft-engaging bracket.

References Cited in the file of this patent

UNITED STATES PATENTS

| | | |
|---|---|---|
| 1,000,106 | Morris | Aug. 8, 1911 |
| 1,792,533 | Francis | Feb. 17, 1931 |
| 2,538,998 | Whitcroft | Jan. 23, 1951 |
| 2,601,477 | Webb et al. | June 24, 1952 |
| 2,619,916 | Rainier | Dec. 2, 1952 |
| 2,621,609 | McCaul et al. | Dec. 16, 1952 |